United States Patent [19]

Straghan

[11] Patent Number: 5,176,406
[45] Date of Patent: Jan. 5, 1993

[54] COUPLING

[76] Inventor: Robert G. Straghan, 11914 Bruce Pl., Maple Ridge, British Columbia B2X 9E1, Canada

[21] Appl. No.: 794,946

[22] Filed: Nov. 20, 1991

[30] Foreign Application Priority Data

Dec. 20, 1990 [CA] Canada .................. 2032830

[51] Int. Cl.⁵ .............................. F16L 35/00
[52] U.S. Cl. ..................... 285/24; 285/319; 285/330; 285/417; 285/921
[58] Field of Search .............. 285/24, 25, 26, 27, 285/28, 29, 330, 319, 921, 417

[56] References Cited

U.S. PATENT DOCUMENTS

| | | | |
|---|---|---|---|
| 1,542,266 | 6/1925 | Palmer et al. | 285/330 |
| 2,420,858 | 5/1947 | Brownell | 285/319 |
| 2,537,284 | 1/1951 | Schuder | 285/921 X |
| 3,950,014 | 4/1976 | Doubleday | 285/27 X |
| 4,804,208 | 2/1989 | Dye | 285/26 |

FOREIGN PATENT DOCUMENTS 8810525 12/1988 European Pat. Off. .......... 285/24

Primary Examiner—Dave W. Arola
Attorney, Agent, or Firm—Breiner & Breiner

[57] ABSTRACT

A snap-on tubular coupling for joining tubular conduit members of the type having axially extending grooves for guiding geophysical instruments. The coupling comprises an unthreaded sleeve slotted to provide outwardly deflectable segments at one or both ends to snap onto ends of the conduct members to be joined. An internal circumferential rib on the sleeve engages a circumferential groove on the conduit. A cylindrical key or button on the casing engages a slot in the end of the coupling to ensure that the longitudinal grooves of the conduit members are in alignment.

3 Claims, 2 Drawing Sheets

COUPLING

This invention relates to tubular conduit systems, the coupling arrangements for such systems and more particularly to a female tubular coupling member for inclinometer guide conductor casing systems.

Inclinometers are defined as devices for monitoring deformation normal to the axis of a conduit by means of a probe passing along the conduit. The probe contains a gravity sensing transducer for measuring inclination relative to the vertical axis. The conduit may be installed in a bore hole, land fill or rock fill and is usually installed in nearly vertical alignment. Inclination readings are made to provide data for initial casing alignments for comparison with subsequent reading to define any change in alignment.

Most inclinometer systems include a permanently installed guide casing made of plastic, aluminum alloy, steel, fibreglass, reinforced plastic or the like. This guide casing or conduit is preferably provided with axially extending internal tracking grooves for controlling orientation of the probe.

The inclinometer probes generally have opposed pairs of wheels which are received in the longitudinal internal grooves in the casing for guiding the probe or other slope detecting instruments moved through the casing.

Problems encountered in selection of suitable casing and ensuring proper installation and reliability include the climatic conditions effecting plastic pipe during installation. For example, solvent cement for plastic pipe is considered unsuitable in very cold weather. Therefore, self-aligning coupling and casing of steel or aluminum might be recommended. However, users may be concerned that metal casing or other stiff casing may be too stiff to follow transverse soil movement in soft soils and imply that the soil may flow around the casing.

Another concern is that installation personnel will be sufficiently skilled and careful. Allowing a section of casing to fall into a bore hole during setting of the solvent cement or pop riveting of adjoining sections is a hazard. Improper alignment of the casing sections also creates problems. One prior coupling has an alignment button for co-operation with a notch on the casing. This coupling arrangement requires the installer to feel for the button engagement while the solvent-cement is setting often resulting in misalignment.

Prior attempts to remedy this problem as shown in GB 2,141,509 include alignment means which are not visible to the installer and therefore misalignment of the casing sections is likely to occur. Furthermore, internal snap action fingers as shown in the British Patent 2,141,509 may fail to engage the casing and the installer could be unaware of a poor connection due to lack of visual control.

It is therefore an object of the present inventor to provide a coupling which can be quickly and accurately assembled.

A further object is the provision of a coupling which can be disassembled without damage to the coupling or casing as would be the case where adhesives or other mechanical fastening means are employed. A still further object is the provision of an exterior keying means visible to the installer for ensuring proper alignment of longitudinal internal grooves in tubular members disposed end to end.

A still further object is the provision of a coupling having mechanical strength such that fasteners and adhesives are unnecessary.

BRIEF SUMMARY OF THE INVENTION

Accordingly the present invention provides a tubular coupling for use on internally grooved tubular conduit members to be joined in end abutting relation said coupling comprising an unthreaded sleeve adapted to be received in an end of said conduit, outwardly deflectable segments at the one end of the sleeve, a circumferential internal recess adjacent each end of said segments of said coupling to form a ridge for co-operation with a circumferential groove an adjacent end of said tubular member and means on said coupling for co-operation with making means on said conduit for aligning internal grooves of said grooved tubular conduit.

The present invention further provides a tubular coupling for use on internally grooved tubular conduit members to be joined in end to end relationship, the coupling comprising an unthreaded sleeve having outwardly deflectable segments at each end thereof, internal circumferential grooves in the ends of the sleeve to provide a ridge for co-operation with an external circumferential groove in an associated one of the tubular conduit members and means on the coupling for co-operation with mating means on the conduit for aligning longitudinal internal grooves of the grooved tubular conduit.

In the accompanying drawings which illustrate a preferred embodiment of the invention.

FIG. 3 is an end view of the coupling and casing of FIG. 2.

FIG. 4 is an enlarged sectional view of a portion of the coupling.

DETAILED DESCRIPTION

Figure 1:
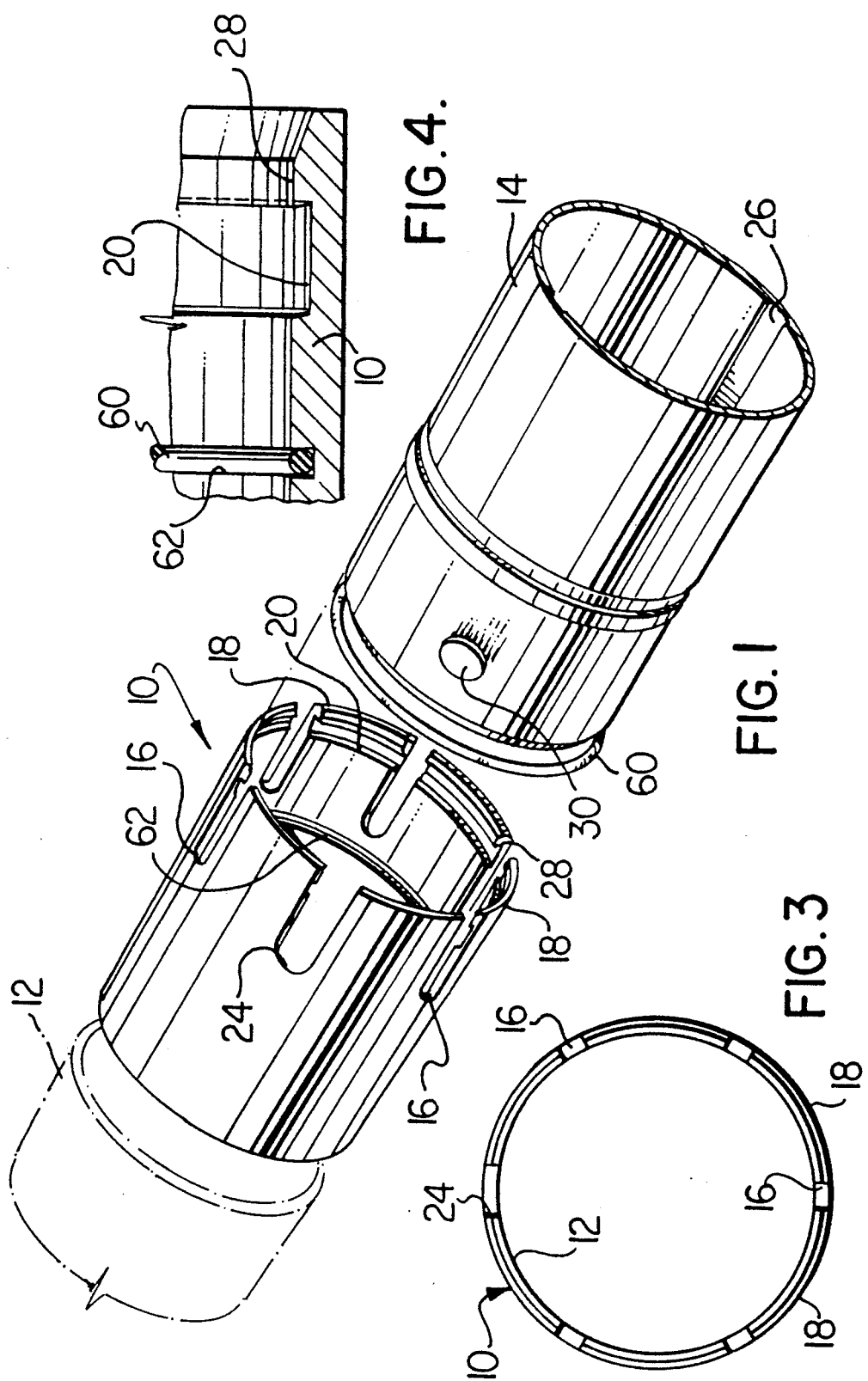
FIG. 1 is an exploded perspective view of a coupling.

Referring now in detail to the drawings, a coupling shown generally at 10 in FIG. 1 for use in joining sections of internally grooved tubular conduit members 12 and 14 to be joined in end abutting relation.

The coupling 10 is an unthreaded sleeve provided with a number of slots 16 to divide the end of the sleeve into outwardly deflectable segments 18. A circumferential internal groove 20 is provided adjacent the ends 22 of the segments 18. An additional slot 24 is provided in one of the segments 18 of the end of the sleeve 10 for purposes to be described below. It will be noted that a circumferential rib 28 is formed between the circumferential groove 20 and the outer end 22 of the coupling 10 as shown more clearly in FIG. 4.

Figure 2:
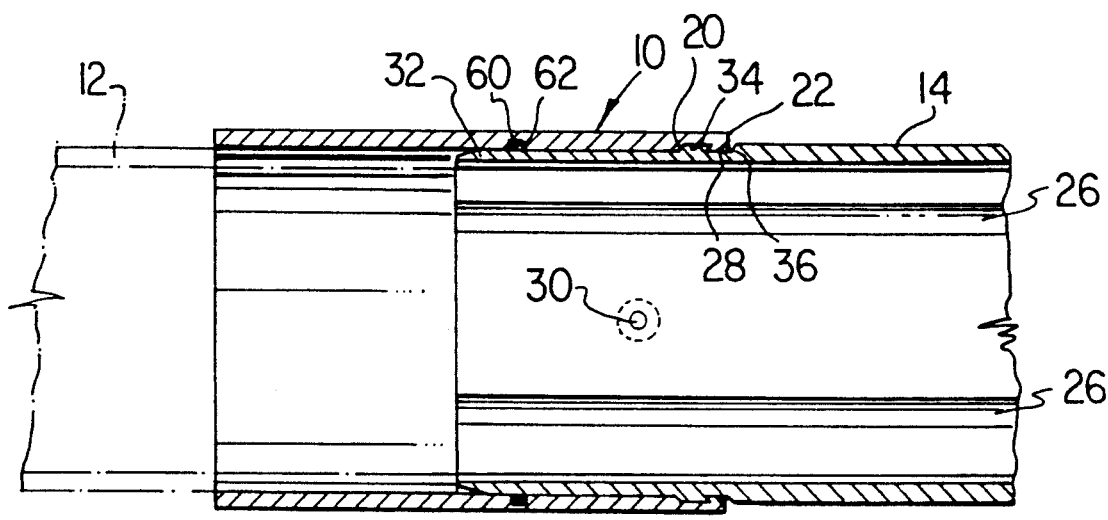
FIG. 2 is a sectional view of an assembled coupling and casing.

Tubular conduit members or sections 12 and 14 shown in FIGS. 1 and 2 adapted to be assembled to form a tubular casing for underground installation have internal grooves 26, in this case four are shown, which extend longitudinally to guide an inclinometer probe (not shown). The internal grooves 26 in adjoining conduit section 12 and 14 must be precisely aligned to facilitate alignment of the grooves 26. A boss or button 30 is provided on the conduit section 14. It will be appreciated that when the button 30 is fully received in the slot 24 of the coupling 10 conduit members 12 and 14 will be in alignment provided of course that the coupling 10 is properly installed on the conduit member 12 intended to be pre-attached as by adhesive or solvent to the conduit 12, precise alignment of the slot 24 with reference to the internal longitudinal grooves 26 is assured.

As shown more clearly in FIG. 2, one end of a conduit section 14 is provided with a reduced diameter portion 32, a circumferential rib 34 to mate with the circumferential groove 20 of the coupling 10 and a circumferential groove 36 to receive the rib 28 formed at the end of the coupling 10.

The coupling 10 and the conduit 12 are preferable made of suitable plastic material such as for example acrylonitrile butadiene styrene (ABS). The coupling 10 is preferably formed as a separate unit adapted to be pre-attached to one end of a conduit 12 by suitable means such as an adhesive.

The button on boss 30 may also be formed as a separate part and adhesively secured in an aperture provided in the conduit 12.

Figure 5:
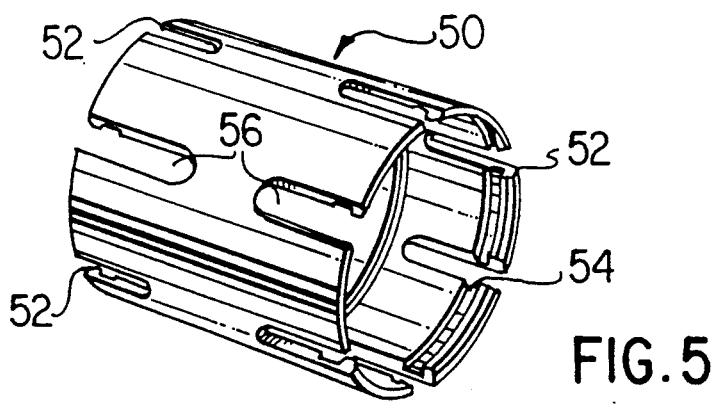
FIG. 5 is a perspective view of an alternative form of the coupling of FIG. 1.

Alternatively, as shown in FIG. 5 a double-ended coupling 50 is provided with slots 52 in both ends for engaging mating ends of conduit sections 14 circumferential grooves 54 (one of which is shown) and button receiving slots 56 are provided in the manner described with reference to FIG. 1, on both ends of the coupling 50.

It will be noted that button receiving slots 56 are a different width than the slots 56 so that incorrect alignment due to a button 30 being received in slots 16 or 52 is prevented.

The couplings 10 and 50 may be provided with a groove 60 to receive and O-ring 62 for co-operation with an outer end of the reduced diameter portion 32 of the conduit 14. In use, a coupling 10 which are pre-attached to a conduit sections 12 are inserted over the reduced diameter sections of the conduits 14 so that segments 18 and the internal ribs snap into engagement with the mating grooves 36. Since the button 30 would prevent full assembly of the coupling and conduit the coupling 10 must be rotated to allow the button 30 to move fully into the extra slot 24, thereby aligning internal longitudinal section 12 and 14 while giving a visible indication that such alignment has been carried out.

The embodiments of the invention in which an exclusive property or privilege is claimed are defined as follows:

1. A tubular coupling for use with first and second internally longitudinally grooved tubular conduit members to be joined in end abutting relation and structured to guide an inclinometer therethrough, said coupling comprising an unthreaded sleeve having a first open end adapted to be received on an end of said first conduit member, outwardly deflectable segments at a second open end of said sleeve, a circumferential internal recess adjacent each of said deflectable segments constructed and arranged to form a ridge for cooperating with a circumferential groove present in said second tubular member, and a means in said coupling for cooperation with a mating means on said second conduit member to provide for the alignment of said internal longitudinal grooves of said first and second tubular conduit members.

2. A tubular coupling for use with first and second internally longitudinally grooved tubular conduit members to be joined in end to end relationship, said coupling comprising an unthreaded sleeve having outwardly deflectable segments at each end thereof, internal circumferential grooves in each end of the sleeve adjacent said deflectable segments constructed and arranged to provide a ridge for cooperation with an external circumferential groove present in an associated one of said tubular conduit members, and means on said coupling for cooperating with a mating means on said conduit members to provide for the alignment of said internal longitudinal grooves of said tubular conduit members.

3. A tubular coupling as claimed in claim 2 wherein said means on said coupling for cooperation with said mating means comprises a slot and said mating means comprises a raised button.

* * * * *

UNITED STATES PATENT AND TRADEMARK OFFICE
CERTIFICATE OF CORRECTION

PATENT NO. : 5,176,406
DATED : January 5, 1993
INVENTOR(S) : Robert G. Straghan

It is certified that error appears in the above-identified patent and that said Letters Patent is hereby corrected as shown below:

Column 3, line 7, "portion 32." should read -- portion 32,--;

Column 3, line 25, "FIG 1." should read -- FIG 1,";

Column 4, line 37, "claim 2" should read -- claim 1 --.

Signed and Sealed this

Fifteenth Day of February, 1994

Attest:

BRUCE LEHMAN

*Attesting Officer*    *Commissioner of Patents and Trademarks*